H. C. SCHAPER.
WEIGHT INDICATOR FOR SCALES.
APPLICATION FILED FEB. 24, 1920.

1,423,885.

Patented July 25, 1922.
3 SHEETS—SHEET 1.

Inventor
Henry C. Schaper

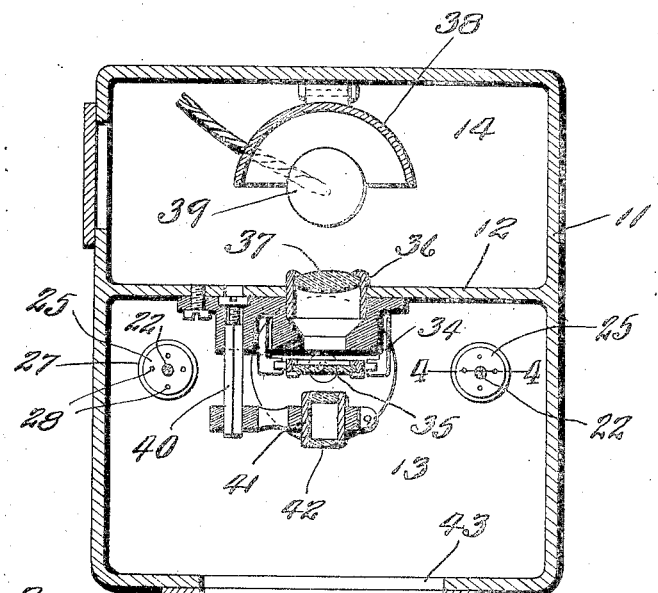
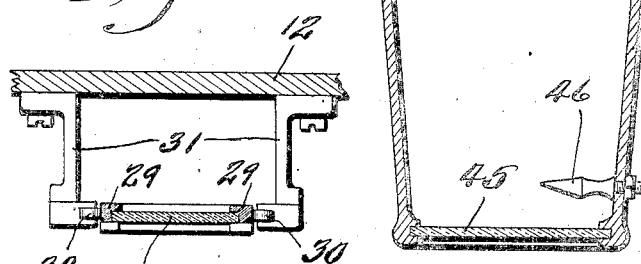
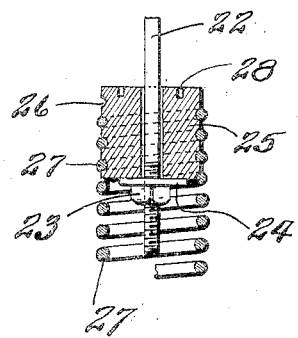
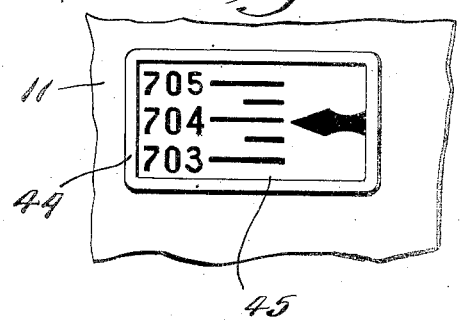

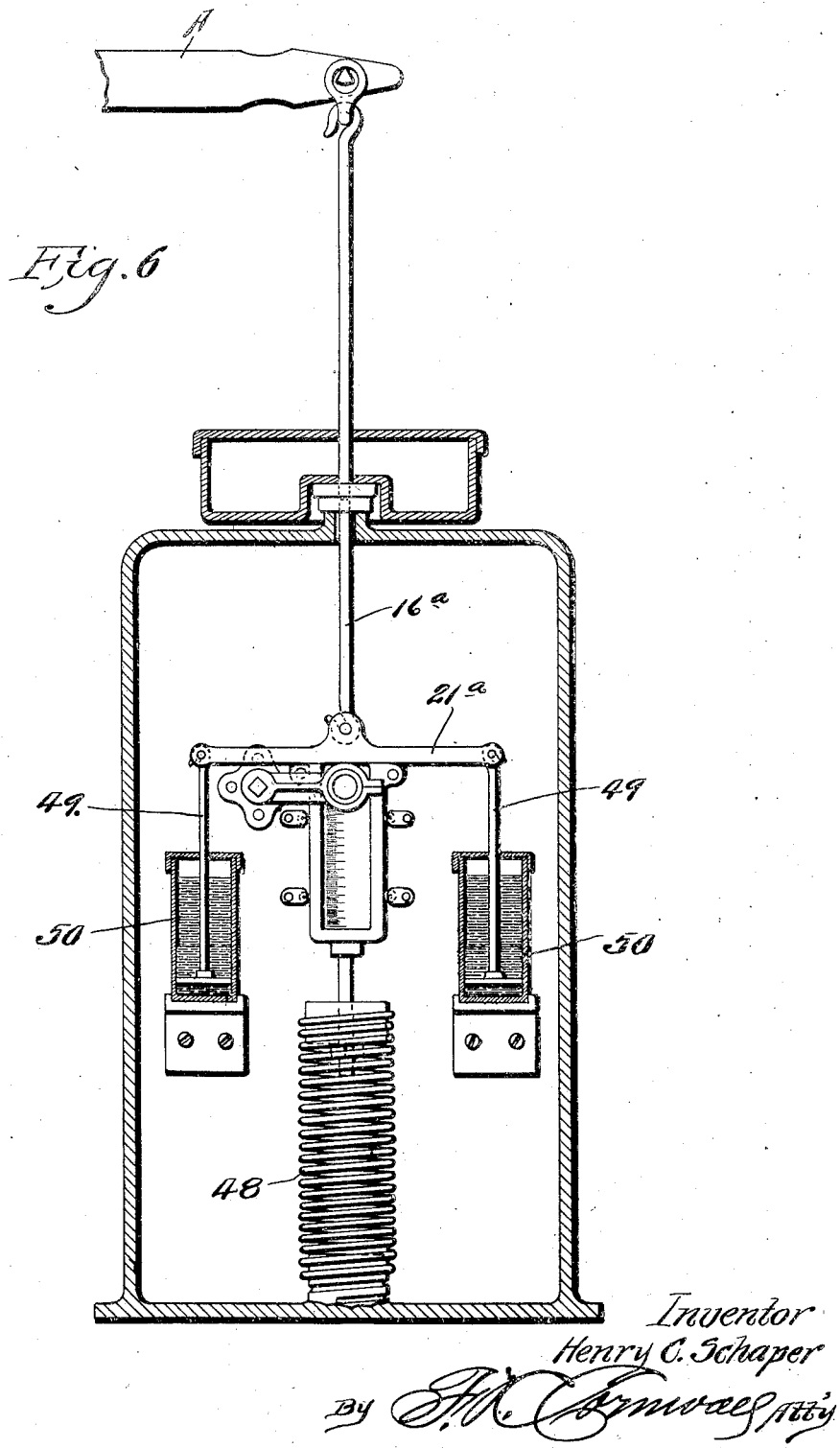

BEST AVAILABLE COPY

UNITED STATES PATENT OFFICE.

HENRY C. SCHAPER, OF ST. LOUIS, MISSOURI, ASSIGNOR TO THE GENERAL AUTOMATIC SCALE COMPANY OF ST. LOUIS, MISSOURI, A CORPORATION OF MISSOURI.

WEIGHT INDICATOR FOR SCALES.

1,423,885.  Specification of Letters Patent.  Patented July 25, 1922.

Application filed February 24, 1920. Serial No. 360,571.

*To all whom it may concern:*

Be it known that I, HENRY C. SCHAPER, a citizen of the United States, residing at St. Louis, Missouri, have invented a certain new and useful Improvement in Weight Indicators for Scales, of which the following is a full, clear, and exact description, such as will enable others skilled in the art to which it appertains to make and use the same, reference being had to the accompanying drawings, forming part of this specification.

My invention relates generally to scales or weighing machines, and more particularly to means associated with and operated by a moving part of the scale or weighing machine for rapidly and accurately indicating or displaying with relatively large weight indicating numerals, the weight of loads placed upon the scale or weighing machine platform, and the construction herein disclosed is an improvement on the weight indicators for scales disclosed in my copending patent applications, Serial Number 129,604 filed November 4, 1916, and Serial Number 207,683 filed December 18, 1917.

The principal objects of my present invention are, to generally improve upon and simplify the construction of the weight indicating mechanisms disclosed in the applications aforesaid, and to provide a simple and efficient means for obtaining the direct weight indicating readings from the medium that yieldingly resists the movement of the scale beam or other part of the scale to which the indicating mechanism is connected, and which yielding resistance medium in this instance, takes the form of a retractile spring.

In the constructions disclosed in my above-mentioned copending applications, the yielding resistance medium is in the form of a pendulum or gravity weight and involves the mounting of journals in suitable bearings and the operation of the latter necessarily creates a certain amount of friction.

It is one of the principal objects of my invention to wholly eliminate friction in an automatically operating weight indicating mechanism, and to attain this object I propose to provide a construction wherein a direct connection is made between a yielding resistance element, such as a retractile spring, and the scale beam or other movable part of the scale, and to associate with said connection a transparent member carrying a graduated scale, and the latter operating in conjunction with suitable lenses and a source of light, whereby the graduations of the scale and the weight indicating numerals adjacent to said graduations are projected in enlarged form onto a screen or ground glass whereby they may be readily observed by the weighman or person in charge of the scales.

Further objects of my invention are, to eliminate in an automatically operating weight indicating device, all gearing, racks, and pinions and journal bearings; to provide for the facile adjustment of the various parts of the operating mechanism; to provide means preferably in the form of a dashpot for eliminating vibration of the parts during operation; and, further, to provide a weight indicating device which is readily responsive in operation and accurate and effective in performing its intended functions.

With the foregoing and other objects in view, my invention consists in certain novel features of construction and arrangement of parts, hereinafter more fully described and claimed, and illustrated in the accompanying drawings, in which—

Figure 2 is a horizontal section taken approximately on the line 2—2 of Figure 1.

Figure 3 is an enlarged horizontal section taken on the line 3—3 of Figure 1.

Figure 4 is an enlarged detail section taken approximately on the line 4—4 of Figure 2.

Figure 5 is an enlarged elevational view of the screen or ground glass onto which the marks of the graduated scale and the weight indicating numerals are projected.

Figure 6 is a vertical section taken through the center of a modified form of the weight indicating mechanism.

Figure 1:
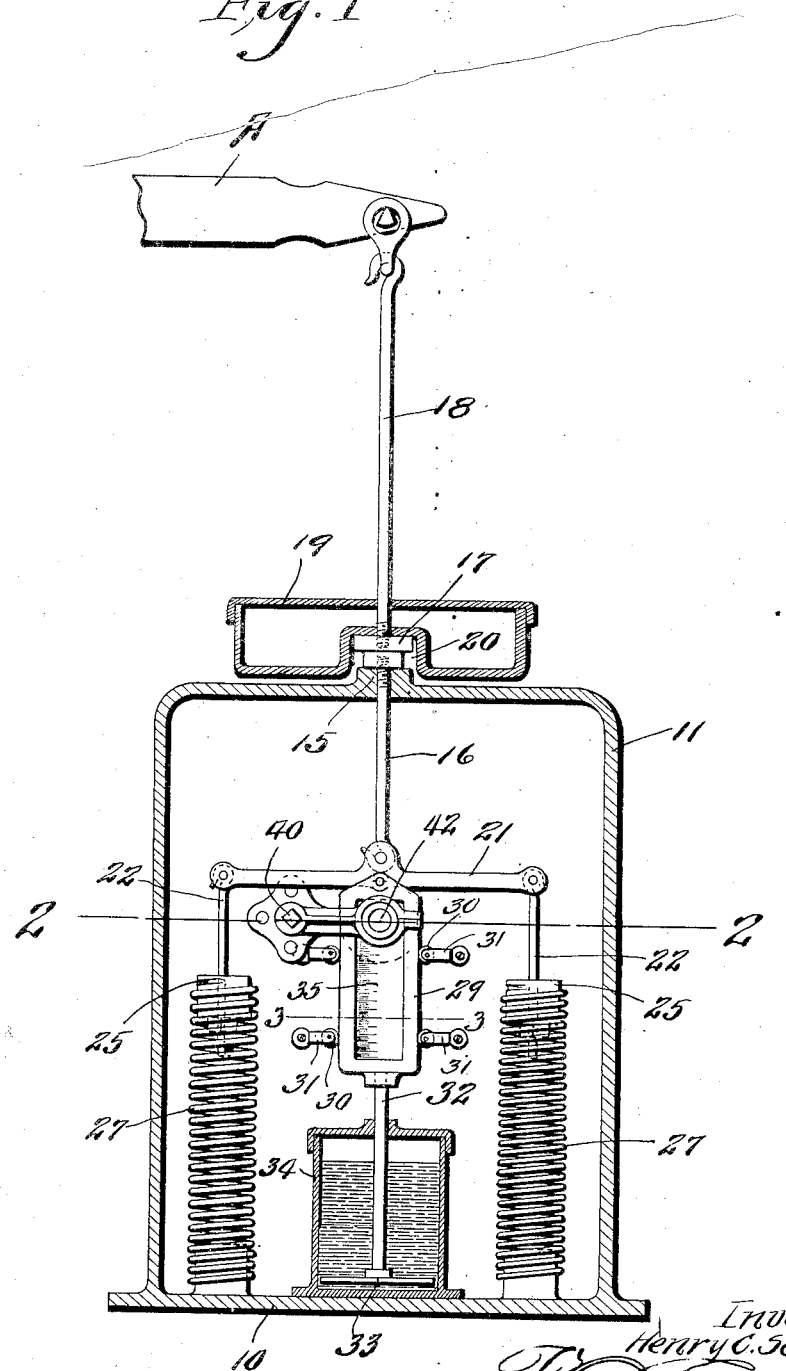
Figure 1 is a vertical section taken through the center of a weight indicating apparatus of my improved construction, the same being directly connected to a scale beam.

Referring by numerals to the accompanying drawings, and particularly to Figures 1 to 5 inclusive, which illustrate a practical embodiment of my invention, 10 designates a base plate on which is positioned a box-like housing 11, and arranged therein between the front and rear walls is a vertically disposed partition 12, and which latter divides the space within the housing 11 into front and rear compartments 13 and 14, respectively.

Formed in the top of the housing 11 above the front chamber 13 is a bearing 15 and arranged to slide freely therethrough is a rod 16, the upper end of which is coupled by means of a nut 17, to the lower end of a rod 18, the upper end of the latter being suitably connected to a vertically movable part of a scale or weighing machine, preferably the scale beam A as illustrated in Figure 1.

Positioned on the lower portion of rod 18 and normally resting upon the nut 17 is a counterpoise 19, in the underside of which is formed a recess 20 which receives the nut 17, and this counterpoise is preferably hollow and its top plate or a portion thereof is removable in order to permit suitable counter-weights to be placed within the hollow body.

Pivotally connected to the lower end of rod 16 is a horizontally disposed bar 21 and depending from the ends thereof are short rods 22, the lower portions of which are threaded to receive nuts 23 (see Fig. 4). Positioned on top of these nuts 23 are washers 24, and loosely positioned on the lower portions of the rods 22 and resting upon said washers are cylindrical blocks 25, in the peripheries of which are formed spirally disposed grooves 26.

The upper portions of retractile coil springs 27 are seated in the threads 26 in blocks 25, and the lower portions of these springs are secured in any suitable manner to the base plate 10 or to lugs projecting upwardly therefrom. The springs 27 are uniform in size and length in order that their tension may be equal, but should the tension of one spring vary with respect to the other, either one or both of the blocks 25 may be rotated so as to be screwed into or out of the upper portion of the spring, thereby changing the working length of the springs and consequently adjusting and regulating the tension thereof.

In order that the blocks 25 may be readily rotated, their upper portions may be made square or non-circular in order to receive a wrench or like tool, or recesses such as 28 may be formed in their top surfaces and which recesses are adapted to be engaged by a spanner wrench.

Pivotally connected to the center of cross bar 21 and depending therefrom is a substantially rectangular frame 29, the outer edges of which bear against small anti-friction rollers 30, the latter being journaled in the outer ends of brackets 31 that project forwardly from partition 12. Depending from frame 29 is a rod 32, the lower end of which carries a horizontally disposed disk 33 that occupies a dash-pot the latter being in the form of a closed receptacle 34, and which contains a body of suitable heavy liquid. This dash-pot is effective in absorbing all vibration of the frame 29 while the same is moved vertically during the weighing operations.

Removably positioned in the frame 29 is a section of transparent material 35, one of the faces of which is provided with a scale composed of graduation marks, certain of which are consecutively numbered. Obviously this graduated scale is very small or microscopic in size.

Formed in the partition 12 and at a point in direct horizontal alignment with the point normally occupied by the zero mark or upper end of the graduated scale, is an opening that is occupied by a short tubular member 36, the same carrying one or more condensing lenses such as 37. Positioned in chamber 14 to the rear of this lens is a reflector 38 and arranged in front of the latter is a source of light 39, preferably an electric lamp. Secured to partition 12 within the chamber 11 is a forwardly projecting arm or bracket 40, and adjustably carried thereby is a short tubular member 41, in which are arranged two or more projecting lenses 42. These lenses, which are in direct horizontal alignment with lens 37, are spaced apart from said last mentioned lens and the frame 29 carrying the transparent member 35 which bears the graduated scale is positioned for operation in the space between said lens 37 and the lenses 42.

Formed in the front wall of the housing 11 and in front of the lenses 42 is a relatively large opening 43, and secured to said housing 11 around this opening is a forwardly projecting auxiliary housing 44, in the front end of which is positioned a section 45 of translucent material, such as ground glass and which forms a screen onto which the marks of the graduated scale are projected by the lenses and source of light heretofore described.

Adjustably screw-seated in a threaded opening formed in one of the side walls of the auxiliary housing 44 and preferably a short distance to the rear of screen 45 is a point 46, which is adapted, while the apparatus is in operation, to cast a well-defined shadow on the inner surface of the screen 45, and said shadow serving as a guide for the reading of the weight indicating numerals that are projected onto said screen by the lenses and source of light. (See Fig. 5.)

Under normal conditions or while there is no load on the scale platform and the parts of my improved indicator are at rest, said parts occupy the positions as illustrated in Figure 1, with the zero mark of the graduated scale on the transparent member 35 in direct alignment with the centers of the lenses 37 and 42. When lamp 39 is lighted, the rays therefrom will by the reflector 38 be directed forwardly through condensing lens 37, thence through transparent member 35, and thence through projecting lenses 42, and as the latter are of the wide angle variety, the lines of demarcation and numerals forming the graduated scale on member 35 will be greatly enlarged when projected onto the ground glass 45.

When a load is placed on the platform of the scale with which my improved indicating apparatus is associated, the end of beam A to which rod 18 is connected will be moved upward, and as a result, the rod 16 that is connected to said rod 18 and the parts to which said rod 16 is connected will be correspondingly moved upward, and which movement will be yieldingly resisted by the tension of springs 27.

When a balance is reached, the upward movement of the beam A and parts connected thereto ceases, and the graduated mark and adjacent weight indicating numerals that are in direct alignment with the centers of the lenses 37 and 42 will be projected in enlarged form onto the ground glass or screen 45, where they may be readily observed by the weighman or person in charge of the scale, and the reading of this weight indicia is greatly facilitated by the shadow cast on the inner surface of the screen by the pointer 46.

As soon as the weight is removed from the platform of the scale, the springs 27 will restore the various parts of the indicating mechanism to their normal positions and with the zero mark of the graduated scale in alignment with the centers of the lenses.

During the vertical travel of frame 29, it will move freely and with little friction due to its engagement with the anti-friction rollers 30 and the dash-pot associated with the frame 29 which is effective in wholly eliminating all vibration during operation. The cross bar 21 which serves as a part of the connection between rod 16 and the springs 27 performs the functions of an equalizer in the event that any variation of tension of the springs develop while the same are in service and if such variation of tension does develop the difference of tension can be easily and quickly equalized or made uniform by proper manipulation of the members 25 that are adjustably positioned in the upper ends of the springs.

In the modification illustrated in Figure 6, the frame carrying the transparent member that bears the graduated scale is directly connected to the upper end of a yielding resistance element such as a spring 48 and the ends of the cross bar 21$^a$ that is pivotally connected to the lower end of rod 16$^a$ are connected to the upper ends of plungers 49 that operate in dashpots 50. The operation of this modified construction is practically the same as that of the apparatus heretofore described, the only difference of construction being the employment of a single yielding resistance medium or spring such as 48 instead of a pair of springs such as 27.

A weight indicator of my improved construction is comparatively simple, can be easily and cheaply manufactured, and can be readily combined with practically all types of beam scales now in general use. The apparatus is very positive and accurate in operation, instantly displays in comparatively large form weight indicating numerals that correspond to the weight of the load placed on the scale platform, and as said apparatus is wholly devoid of gearing, racks and pinions, and journal bearing, the development of friction and lost motion in the operating parts of the device is reduced to a minimum.

In the event that any part of my improved weight indicating mechanism becomes inoperative, the weighing scale and its beam may be operated in the usual manner by placing the regular counterbalancing weights on top of the housing 19.

It will be readily understood that minor changes in the size, form and construction of the various parts of my improved weight indicator can be made and substituted for those herein shown and described, without departing from the spirit of my invention, the scope of which is set forth in the appended claims.

I claim:

1. The combination with a weighing scale, of a vertically movable weight indicia bearing member connected to and adapted to be actuated by a movable part of the scale, a horizontally disposed lever connected to said weight indicia member, means connected to said horizontal lever for yieldingly resisting the movement of said member in one direction, a screen, and means including a source of light and lenses for projecting the weight indicia onto said screen.

2. The combination with a weighing scale, of a transparent member connected to and adapted to be actuated in a vertical plane by a movable part of said scale, said transparent member bearing weight indicia, equalizing means associated with said transparent member for yieldingly resisting its movement in one direction, a screen, and means including a source of light and lenses for projecting said weight indicia onto said screen.

3. The combination with a weighing scale, of a weight indicia-bearing member movable in a vertical plane, equalizing means connected to said weight indicia member and adapted to be actuated by a movable part of the scale, means connected to said equalizing means for yieldingly resisting the movement of said member in one direction, a screen, means including a source of light and lenses for projecting the indicia onto said screen, and means associated with said weight indicia bearing member for absorbing vibration during movement of the parts.

4. The combination with a weighing scale, of a vertically movable transparent member, equalizing means connected to said transparent member and adapted to be actuated by a movable part of said scale, said transparent member bearing weight indicia, means associated with said equalizing means for yieldingly resisting movement of said transparent member in one direction, a screen, means including a source of light and lenses for projecting said weight indicia onto said screen, and means associated with said transparent weight indicia bearing member for absorbing vibration during movement of the parts.

5. The combination with a weighing scale, of yielding resistance means, a horizontally disposed bar pivotally connected to a movable part of the scale and connected at its ends to said yielding resistance means, a transparent member associated with said horizontally disposed bar and movable in a vertical plane, which transparent member bears weight indicia, a screen, and means including a source of light and lenses for projecting said weight indicia onto said screen.

6. The combination with a weighing scale, of yielding resistance means, an equalizing connection from a movable part of the scale to said yielding resistance means, a transparent member associated with said connecting means and movable in a vertical plane, which transparent member bears weight indicia, a screen, means including a source of light and lenses for projecting said weight indicia onto said screen, and means for absorbing vibration during movement of the associated parts.

7. The combination with a weighing scale, of a vertically movable transparent member bearing weight indicia, which member is directly connected to and adapted to be actuated by a movable part of the scale, a spring connected to said transparent member for resisting the movement thereof in one direction, means for varying the tension of said spring, a screen, and means including a source of light and lenses for projecting the weight indicia onto said screen.

8. The combination with a weighing scale, of a transparent member bearing weight indicia, which member is directly connected to and adapted to be actuated in a vertical plane by a movable part of the scale, a spring for resisting the movement of the weight indicia bearing member in one direction, means for varying the tension of said spring, a screen, means including a source of light and lenses for projecting the weight indicia onto said screen, and means for absorbing the vibration of the parts while in operation.

9. In a weight indicator for scales, a transparent member bearing weight indicia, which member is adapted to be connected to a movable part of a scale, and operated by it in a vertical plane, means for yieldingly resisting the movement of said member in one direction, a screen, and means including a source of light and lenses for projecting the weight indicia onto said screen.

10. In a weight indicator for scales, a trasparent member bearing weight indicia, means whereby said member may be connected to the movable part of a scale, and adapted to be moved in a vertical plane, a spring connected to said transparent member for resisting the movement of said member in one direction, a screen, and means including a source of light and lenses for projecting the weight indicia onto said screen.

In testimony whereof I hereunto affix my signature this February, 1920.

HENRY C. SCHAPER.